United States Patent [19]
Wilson

[11] Patent Number: 5,842,172
[45] Date of Patent: Nov. 24, 1998

[54] METHOD AND APPARATUS FOR MODIFYING THE PLAY TIME OF DIGITAL AUDIO TRACKS

[75] Inventor: Monti R. Wilson, Overland Park, Kans.

[73] Assignee: TensorTech Corporation, Lenexa, Kans.

[21] Appl. No.: 426,224

[22] Filed: Apr. 21, 1995

[51] Int. Cl.$^6$ ........................................................ G10L 9/12
[52] U.S. Cl. .......................... 704/503; 704/267; 704/213; 704/214
[58] Field of Search ...................................... 395/2.09, 2.1, 395/2.14, 2.16, 2.2, 2.67, 2.74, 2.76, 2.77, 2.91–2.95, 2.22, 2.23

[56] References Cited

U.S. PATENT DOCUMENTS

| | | | |
|---|---|---|---|
| 4,022,974 | 5/1977 | Kohut et al. | 395/2.71 |
| 4,209,844 | 6/1980 | Brantingham et al. | 395/2 |
| 4,406,001 | 9/1983 | Klasco et al. | 395/2.1 |
| 4,435,832 | 3/1984 | Asada et al. | 395/2.71 |
| 4,864,620 | 9/1989 | Bialick | 395/2.16 |
| 5,175,769 | 12/1992 | Hejna, Jr. et al. | 395/2.2 |
| 5,386,493 | 1/1995 | Degen et al. | 395/2.76 |
| 5,479,564 | 12/1995 | Vogten et al. | 395/2.76 |

OTHER PUBLICATIONS

R. Suzuki et al., "Time–Scale Modification of Speed Signals Using Cross–Correlation Functions," IEEE Trans. on Consumer Electronics, 38(3):357–363, Aug. 1992.

*Primary Examiner*—Allen R. MacDonald
*Assistant Examiner*—Donald L. Storm
*Attorney, Agent, or Firm*—Kokjer, Kircher, Bowman & Johnson

[57] ABSTRACT

A method an apparatus for modifying the play time of digital audio tracks. For each data block of samples taken from a plurality of such blocks comprising an audio stream or track, the original block data plus a time shifted copy of the block data are superimposed, in a manner dependent on either desired expansion or desired contraction of play time, to create an overlap region. The overlap region is selected at a position of best match as resulting from a normalized correlation over the overlap, the super position being weighted by a linear cross-fading function. All signal crossovers (signal transitions of opposite signal sign) in a block are located. A position at which to superimpose a copy of the data block with the data block, and the length of the data block, are determined based upon the location of said crossovers within a given data block. Additionally, as the data blocks are processed, any companding overage (companding in excess of a selected nominal companding amount) or underage (companding less than a selected nominal companding amount) are monitored and necessary adjustments are made so that the results in a final audio track length are very precise. Accordingly, the play time of an audio track or stream is either expanded or compressed in time while both preserving its original pitch and reproducing the sound at a very high quality level basically free of noise, distortion, and audible artifacts.

26 Claims, 2 Drawing Sheets

METHOD AND APPARATUS FOR MODIFYING THE PLAY TIME OF DIGITAL AUDIO TRACKS

BACKGROUND OF THE INVENTION

1. Field of the Invention

The present invention relates in general to a method and apparatus for performing time-scale modification on the play time of digital audio tracks. In particular, the present invention relates to an improved method and apparatus, for time-scale modification, of a type which utilizes cross-faded, overlapped audio signals.

2. Description of the Related Art

Time-scale modification, also known as time companding either compresses or expands the play time of an audio track without changing the pitch when the track is played back at the same sample rate per second as the original recording. Although the term audio track is used, this also means an audio stream, since audio data need not be stored, but can be processed in real time. Evidently, with rate change, the playback of a recording that is played at a faster rate will have higher pitch and the playback of a recording that is played at a slower rate will have lower pitch. Pitch change is audibly objectionable, hence the many efforts to time compand without changing pitch.

Many attempts have been made to perfect time companding on the play time of audio tracks. Many of these previous attempts to time compand have centered the work on speech. This is so because one of the applications for time companding is to use expanded audio tracks to assist slow learners. Another speech application utilizing time companding is the speed-up of dictation playback.

In the world of commercial broadcasting, however, time companding must encompass both speech and music or any mixture of the two. Applications range from the tailoring of audio track lengths to match time slots, to audio editing or to deliberate tempo alteration of musical recordings.

Previous attempts to time compand fall into two broad classes: analog and digital. U.S. Pat. No. 4,406,001 describes an analog method that breaks up audio signals into frequency bands and recombines them with synchronous variable time delays to achieve pitch correction. The modern trend in audio is digital methods, however, and U.S. Pat. Nos. 4,022,974, 4,209,844, 4,435,832, and 4,864,620 disclose digital techniques to accomplish time companding. The present invention also provides a method and apparatus for digital time companding, although representing a major improvement over previous work. Of the above patents, all but U.S. Pat. No. 4,864,620 relate only to synthesized or parametric speech, which is substantially unrelated to the present invention.

Perhaps the most promising digital method of time companding utilizes the concept of cross-faded, overlapped audio signals, the overlaps occurring at places satisfying some best match condition. The research paper by Roucous and Wilgus, "High Quality Time-Scale Modification for Speech", ICASSP 85, Proceedings of the IEEE International Conference of Acoustics, Speech, and Signal Processing, pp 493–6, Volume 2, 1985 introduced cross-faded overlap processing utilizing multiplicative cross-correlation for best matching and U.S. Pat. No. 4,864,620 offered the improvement of cross-faded overlaps with a computationally superior average magnitude difference function.

Both of these methods invoke a search for a best match via a continuous sliding window calculation over a variable search length. The present invention also utilizes cross-faded overlaps, but with best matches found by a radically new concept that does not use the continuous sliding window search technique.

A recent time companding patent, U.S. Pat. No. 5,175,769, is also based on cross-faded overlaps and utilizes a search method for best match that is totally different from the inventive method of this patent. In fact, the invention disclosed in U.S. Pat. No. 5,175,769 utilizes overlaps of fixed length, a prescription that will definitely fail to produce high quality audio reproduction on certain types of audio that are readily reproduced at high quality by the current invention method.

Previous time companding methods and apparatus have not received wide commercial acceptance, presumably because their audio reproduction quality is not high enough in general to satisfy the very demanding commercial broadcast marketplace. The prior methods introduce into the companded audio varying amounts of noise, distortion, and audible artifacts, especially for large amounts of time companding. The present invention overcomes the drawbacks of the prior art with a digital method (and apparatus) of time companding based on cross-faded overlaps that is basically free of noise, distortion, and audio artifacts over a limited range of time companding roughly less or equal to a 20% length change in play time. This limited range is sufficient to serve much of the commercial broadcast marketplace in applications of time slot matching and audio editing. Audio experts have listened to our companding results and judged it quite superior to the results of previous methods to which they have listened.

SUMMARY OF THE INVENTION

An object of the present invention is to provide a method and apparatus for performing very high quality time companding on the play time of digital audio.

Another object of the present invention is to provide a method and apparatus for modifying the play time of digital audio, which method and apparatus are easy to implement and use.

A further object of the present invention is to provide a method and apparatus, for modifying the play time of digital audio, which preserves the pitch of the original audio and reproduces the audio, at a modified play time, basically free of noise, distortion, and audible artifacts.

It is a further object of the present invention to superimpose a block of audio data with a copy of at least a portion of itself, in a manner dependent upon a computed normalized correlation, to thereby create an overlap region.

It is a principal object of the present invention to locate in an audio signal, comprised of a stream of signal representations, locations in the stream of signal representations at which polarity changes exist, and to utilize the positions in overlapping blocks of the signal representations.

These and other objects are achieved by method and apparatus for processing time domain audio signal data such that the play time of the audio track can be either expanded or contracted in time while both preserving the original pitch and reproducing the sound at a very high quality level basically free of noise, distortion, and audible artifacts.

In the present invention, blocks of audio data are processed sequentially. The length of the blocks can be variable from block to block, but a preferred embodiment utilizes fixed length blocks. For each block, of preferred length 8192 samples, the original block data plus a time shifted copy of the block data are superimposed, in a manner dependent on either desired expansion or desired contraction of play time, to create an overlap region. The overlap region is selected at a position of best match as resulting from a normalized correlation over the overlap, the superposition being weighted by a linear cross fading function.

A primary principle of the present invention is the method of (and apparatus for) selecting a best match position for the overlap. In accordance with the principles of the present invention, the nominal length of the overlap is the desired companding percentage of the fixed block length. The companding percentage is the ratio of desired play time of the audio track to the original play time of the audio track. Initially, all crossovers (signal transitions of opposite signal sign) in a block are located. For each crossover as a potential starting location for the overlap, a normalized difference correlation is computed for both the nominal overlap length and a trial overlap length. The trial overlap length is an integer multiple of full-period crossover spacings that first exceeds the nominal length.

Specifically, trial overlap lengths are determined by summing what are termed herein as full period crossovers, wherein the summation stops when the sum equals or first exceeds the nominal length. Full period crossovers, as discussed below, are defined by the length between successive crossovers having the same signal transition polarity ("+ to –" or "– to +" in signal amplitude). If the block contains no crossovers, the starting location of the overlap (nominal length) is taken at block center. If the block does contain crossovers, for each trial overlap that fits within the current data block, a normalized correlation is computed. In the first of two correlation passes, the maximum result will be either a nominal length overlap or an integer crossover period multiple overlap with the additional constraint that the crossovers between full-period crossovers satisfied a pure tone condition of central location to within ⅛ of the crossover period (crossover separation). In the second pass we try integer multiples of crossover periods that do not satisfy the pure tone condition, called chord overlaps, since they perform outstandingly well on sustained musical chords. Pure tone and chord overlaps are distinguished only by the preferential selection of pure tone overlaps first, because they exhibit the very highest correlations.

The overlap is taken at the crossover start location for which the correlation was greatest positive value <=1, otherwise the nominal length is systematically reduced and retried until either a fit occurs or the block is passed on uncompanded and the deficit made up later. As the blocks are processed, any companding overage is accumulated until it is large enough to pass one or more blocks with either reduced or zero companding to cancel the overage and re-initialize the overage counter. This results in a final audio track length very near to the target time companded length. Changing the balance of right on, over (overage or excess companding), or under (underage or less than nominal companding) amounts of companding, occurs when proceeding from block to block.

Evidently, the above best matching method involves only a subset of a prior art-type continuous window exhaustive search procedure and proceeds quickly, thereby being readily adaptable to real time applications. Note also, however, that a sliding window exhaustive search would not result in the same correlations as the present invention, because the lengths of the optimum overlaps depend on the crossover locations in accordance with the principles of the present invention.

An embodiment of the present invention in hardware can be realized by programmable digital signal processing components. The digital components utilized are well-known to those skilled in the digital audio art. The application of such devices to the present invention is nevertheless not apparent from the devices.

The method according to the present invention of best matching of overlap positions is responsible for maintaining a very high quality of audio reproduction. The present invention produces desirable results because pitch periods (not always the same as crossover periods) always start on crossovers and the choice of nominal length, pure tone, or chord overlaps guarantees a high correlation and greatly minimizes distortion and audio artifacts in both speech and music. Notice that unlike some of the prior companding art, the present invention has no explicit pitch detection step.

The present invention is best understood in detail by reference to the following detailed description in conjunction with the accompanying drawings.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
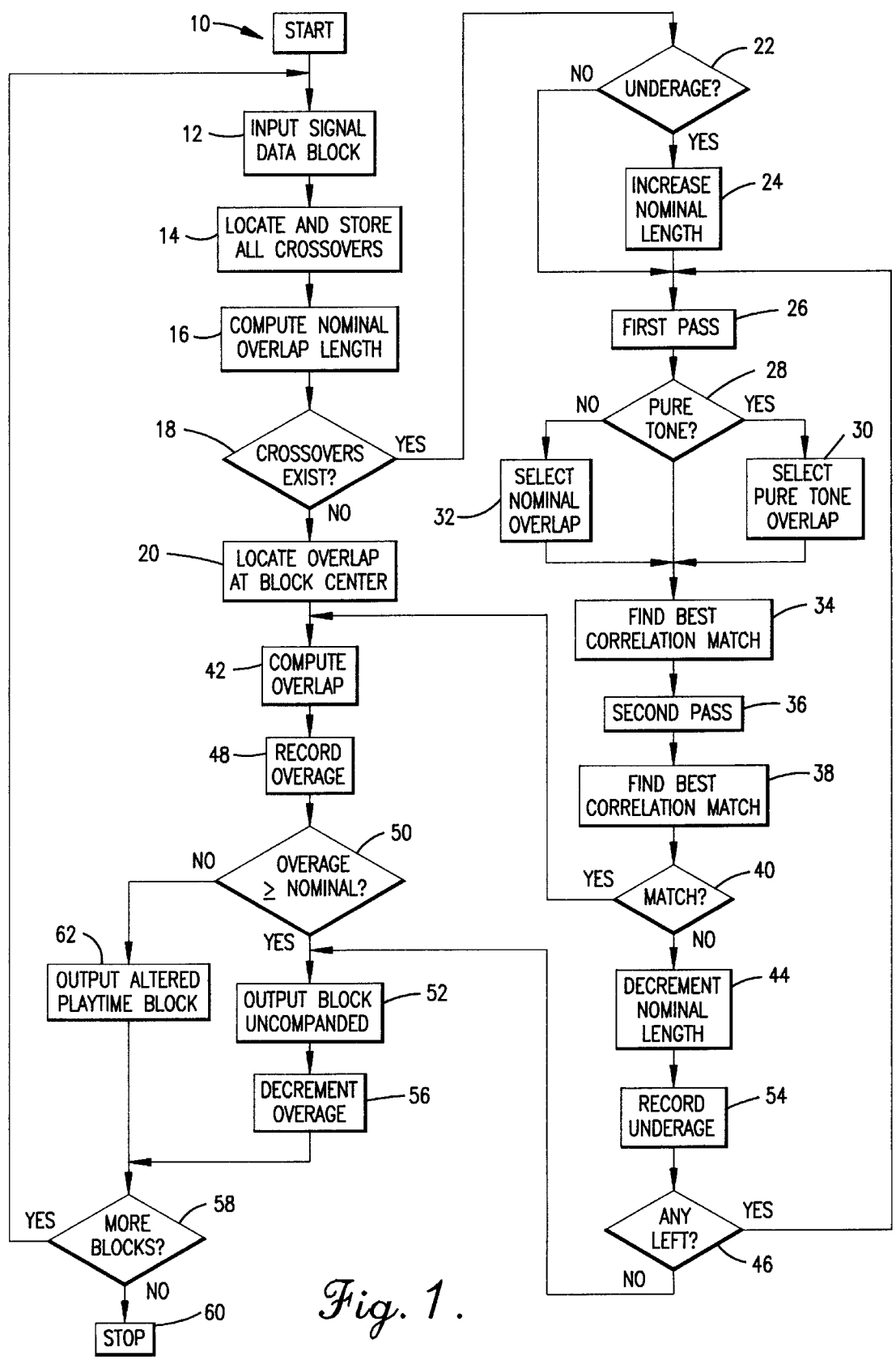
FIG. 1 is a flow chart of the time companding method of the present invention.

With reference initially to FIG. 1, a flowchart, denoted generally by the reference numeral 10, illustrates the method of the present invention, which is carried out by software. As discussed, the present invention finds the best overlap match locations within data blocks when operating to expand or contract the play time of selected audio. It will be appreciated by those skilled in the art that conventional digital recording systems utilize post-code modulation such that signal representations, namely integer samples, of the digitally recorded audio comprise values within a given range. For instance, where conventional 16-bit audio is utilized, the values, corresponding to voltages, range from −32,767 to +32,768. Electronic hardware utilized in recording and broadcasting studios reproduce sound in accordance with a stream of integer values within this range.

In accordance with the principles of the present invention, the play time of audio is selectively altered by dividing an audio stream (e.g., a data stream) into blocks, and superimposing a copy of at least a portion of each block upon itself at a computed matching location. In accordance with further and primary principles of the present invention, selection of the overlap matching location for each data block is determined by utilizing what are referred to herein as crossovers in the data stream. Particularly, a crossover occurs where successive integers in the data stream change signs (e.g., from "+" to "−" or from "−" to "+").

With particular reference to FIG. 1, upon initiating the present invention to compand selected audio, a first data block is selected and input into a buffer. Preferably, the data blocks are fixed in length, with the length preferably being within the range of 4096–8192 samples. In accordance with the principles of the present invention, each data block is preferably 8192 samples, because this length has been found to best eliminate barely audible artifacts. With a block (buffer) length of 8192 samples, the nominal overlap length for the companding range of 5%–20% is approximately 12 milliseconds to 48 milliseconds at a frequency of 32,000 Hz. In this companding range, details of the overlap crossfading are inaudible. If the block size were substantially smaller, too few crossovers may occur within a block at low frequencies. Although a block length of 8192 samples is generally preferred, a block length of 4096 samples is preferred for AM broadcasting with a frequency of 16,000 Hz, to avoid excessive overlap lengths.

Once a block is obtained and input into a buffer, as denoted generally by the reference numeral 12, the present invention locates (and stores in memory) all signal crossovers (signal sign changes) within the current data block, as denoted generally by reference numeral 14. The manner in which signal crossovers are located is not critical. For instance, hardware may be utilized to read the values of each integer to thereby determine crossover locations. Preferably, however, successive integers within the block are multiplied. Where the resulting product is zero or a negative value, a crossover has occurred.

Once all signal crossovers within a current data block are located and stored in memory at step 14, the nominal overlap length is computed at step 16. As discussed, the nominal overlap length is equal to the desired companding percentage multiplied by the length of the current data block. The desired companding percentage is the ratio of the desired play time of the original audio to the actual play time of the original audio.

As indicated at step 18 of flow chart 10 of the present invention, it is determined whether crossovers exist. If no crossovers exist, the length of the overlap initially used is the nominal length and the location at which the overlap is matched (e.g., superimposed) with the original data block may be arbitrarily selected. As indicated at step 20, the location of the overlap is selected at the center of the block.

If, at step 18, crossovers are found to exist, the logic of the present invention determines at step 22 whether a prior underage exists. In other words, at step 22, it is determined whether a previous block was output having companding less than nominal companding.

If, at step 22, a previous underage is found, the computed nominal length is increased by the underage at step 24. Once the nominal overlap length is increased at step 24, or, alternatively, if no prior underage was found at step 22, the logic of the present invention proceeds to step 26, generally referenced as "FIRST PASS". At the FIRST PASS of step 26, a number of things occur. At the FIRST PASS step, a normalized correlation is computed for different trial assumptions. Initially, however, the present invention at step 26 starts at each crossover and makes a pass along the block, keeping track of the additive length of the full period crossovers. Full period crossovers are defined by successive crossovers having the same signal transition polarity, be it +/− or −/+. The concept of full period crossovers is best illustrated by a sinusoidal waveform which crosses over a horizontal axis in a first direction at a first point, in a second direction (opposite from the first direction) at a second point, and again in the first direction at a third point. A full period is defined as that (time or length) which is between the first and third points. This same concept is meant herein by full period crossovers In accordance with the principles of the present invention, the lengths of full period crossovers from an initial crossover are summed, stopping when the additive length first equals or exceeds the nominal length. It will be readily appreciated that the present method step of summing full period crossovers includes comparing the sum with the nominal length each time a full period crossover is added to the sum. This process is repeated during the FIRST PASS step 26 utilizing each crossover as the initial crossover. Each sum determined in a block serves as a trial assumption for computing a normalized correlation. Accordingly, the present invention searches over the full period crossovers, beginning at each crossover, and stops once the sum of the full period crossovers has equalled or just surpasses the nominal length. Particularly, for each crossover within the array of crossover starting locations, this process occurs.

An additional process occurring at the first pass of step 26, is a pre-screening process, wherein once the sum of full period crossovers, beginning at an initial crossover location, equals or first exceeds the nominal length, the length of that summation of full period crossovers is compared with the block length of the initial data block input at step 12. If it is determined that the length of the summed full period crossovers will not fit within the original data block, the summed full period crossover length is discarded, and a correlation is not computed for this data. In other words, at this pre-screening step, a check is made to determine whether the data to be correlated fits within the geometrical constraints posed by the length of the current data block.

Additionally, in accordance with further principles of the present invention, at the same time that a pass is occurring to sum up the full period crossovers, each full period crossover subsegment is checked to determine if it satisfies a centrality condition. A centrality condition is that condition where the signal crossover intermediate the outer crossovers defining the full period crossover is located at the center (e.g., halfway) of the full period crossover. If every full period crossover of the additive sum has this centrality condition, then the audio data block will comprise and be classified by the processor as a pure tone overlap.

In accordance with the principles of the present invention, complete accuracy for determining centrality is not required. Rather, when the integer multiple overlap satisfies the constraint that all crossovers between the full period crossover satisfy centrality to within one-eighth of the crossover period, the overlap is termed a pure tone overlap. Otherwise, the integer multiple of crossover periods not satisfying the centrality condition are termed chord overlaps. As a result, three overlap lengths may be available: pure tone overlap lengths, chord overlap lengths, and the nominal overlap length.

At step 28, the logic of the present invention determines whether a pure tone condition exists. As discussed, a pure tone condition is present where the centrality condition for the block is satisfied. In other words, where each full period crossover (within a data block) has its central crossover point located at least substantially centrally between the outer-most ends of the full period crossover, a pure tone condition exists. As shown at step 30, when a pure tone condition exists, the pure tone overlap length is selected for finding the best correlation match at step 34. When, however, a pure tone condition does not exist as determined at step 28, the nominal overlap length is selected (at step 32) for use in finding the best correlation matching point for overlapping the data blocks.

The choice of normalized correlation utilized in accordance with the present invention is not strictly critical, although a normalized difference correlation is preferred over a normalized multiplicative or normalized regressive correlation due to computational simplicity. The preferred normalized difference correlation utilized with the present invention has the following form:

$$\text{correlation} = 1 - \frac{\text{SUM(over overlap)} *_1|s(n) - s(n +- \text{overlap})|}{(\text{overlap samples})*(\text{max\_voltage})}$$

where s is signal voltage and the + sign is for companding contraction and the − sign for companding expansion. The max_voltage is the absolute local maximum voltage over the correlation samples. Since it varies from overlap to overlap, it makes the correlation result more accurate than if max_voltage were a fixed constant. Since this correlation varies from −1 to 1, we need only select maximum positive correlation to avoid the 180 degree phase error of anticorrelation. Normalized correlation has several advantages, anticorrelation discrimination being one and another being an absolute measure of relative correlation performance.

At step 36, a second pass over the stored crossovers is made. Particularly, during the second pass, for each crossover starting location, a process similar to that which occurred in the first pass is conducted wherein, however, only chord overlaps (if any) are selected. In other words, during the second pass at step 36, full period crossovers, starting at each crossover starting location, are summed, stopping when the sum first exceeds the nominal length. However, unlike the first pass, in which pure tones were selected for computing normalized correlations if present and, if not, the nominal overlap length was selected, in the second pass only the length of chord overlaps (if any) are utilized in computing the normalized difference correlation. It will be appreciated that it is not necessary to conduct an actual second pass for summing purposes. Although re-summing may be done, a determination of whether a block contains pure tone or chord overlaps has already been made at the first pass step. Thus, at second pass step 36, normalized correlations can simply be computed for each chord overlap.

Next, at step 38, the best correlation match is found. In other words, at step 38, it is determined whether any chord overlaps produce a better matching point (e.g., the greatest positive correlation) than did the correlations resulting from the first pass. Particularly, since the normalized difference correlation utilized in accordance with the present invention varies from −1 to +1, the maximum positive correlation need only be selected to avoid 180° phase error of anticorrelation. In this way, normalized correlation has several advantages including anticorrelation discrimination and the advantage that an absolute measure of relative correlation performance is provided.

At step 40, it is determined whether a match has been made. In this regard, it is possible that the results of the first pass and the second pass produced no matches. When, at step 40, a correlation match is present, then both the length of the overlap and the point at which the overlap will be matched with the original data block are now known. Accordingly, at step 42, the overlap is computed. When, however, at step 40 no correlation match was found, then the nominal length, computed originally at step 16, is decremented by a selected amount at step 44. Preferably, the original nominal length is decremented by 20%.

At step 46, it is determined whether after decrementing the original nominal length, any nominal length is left. When the nominal length has not been decremented to zero, thereby meaning that, despite the decrement, some value is left, the logic of the present invention returns to the first pass step 26 and the logic of steps 26–40 are repeated. When, at step 40, still no match is found, the original nominal length is decremented by an additional 20%, and the process repeated. In this way, preferred principles of the present invention utilize a process wherein a loop will be made a maximum of five times in looking for a match—namely, 100% of the nominal length, 80% thereof, 60% thereof, 40% thereof, and 20% thereof. It will be readily appreciated that the nominal length may be decremented by any selected amount at step 44.

As stated, the overlap is computed at step 42, when a match was found at step 40. Additionally, at step 18 (discussed above), when it is initially determined that no crossovers existed within the current data block, then the nominal length computed at step 16 serves as the length of the overlap and the location of the overlap may be arbitrarily set. In accordance with the preferred principles of the present invention, in such a case, the overlap is located at the center of the block, as indicated at step 20. From step 20, the overlap is then computed at step 42. Computation of the overlap is discussed below in detail.

Once the overlap is computed at step 42, any overage is recorded and stored in memory at step 48. At step 50, it is determined whether the overage recorded at step 48 is greater than or equal to the nominal overlap length originally computed at step 16. When the overage is indeed greater or equal to the nominal length, then the current block is output uncompanded, as indicated at step 52. Also, when no best correlation match is found at step 40, and the nominal length had been decremented at step 44, any underage (e.g., that amount which is less than the nominal length) is recorded at step 54 and the current block is output uncompanded, at step 52. When a block is output without being companded, any overage, as having been re-corded at step 48, is automatically decremented, as indicated at step 56. From step 56, the logic proceeds to step 58, wherein the question is asked whether there are more data blocks for processing. When more data blocks exist, the sequence of the present invention returns to step 12, and the process is undertaken for the next data block. When, alternatively, no more blocks are present for processing, as determined at step 58, the companding method of the present invention stops, as indicated at step 60.

Returning to step 50, when the overage recorded at step 48 is not greater than or equal to the original nominal overlap length computed at step 16, then the method of the present invention outputs an altered play time block, as indicated at step 62. In other words, the play time of the current data block is output in a companded form (e.g., either expanded or compressed). From step 62, the process proceeds to step 58, wherein it is determined whether more blocks are available for processing. When more blocks are available for processing, then the process returns to step 12 and a new current data block is input, and the companding method is repeated for the new current data block. When, alternatively, it is determined at step 58 that no more blocks are present for processing, then companding for the selected audio is completed, and the processing stops, as indicated by step 60.

Figure 2:
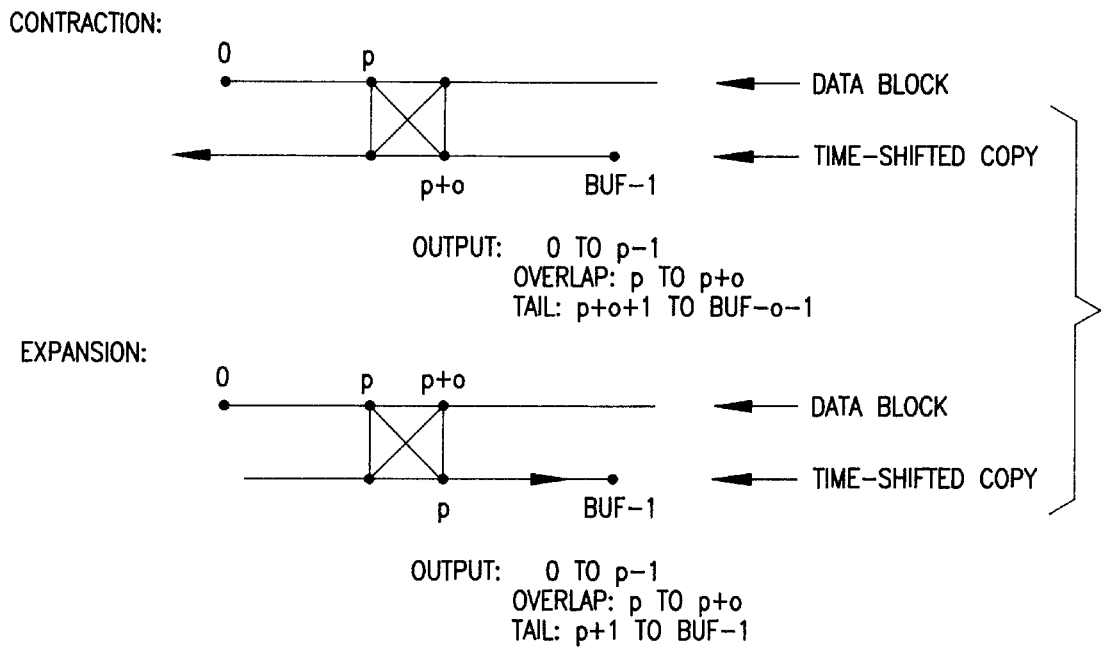
FIG. 2 is a diagram illustrating the cross-faded overlaps of the present invention.

FIG. 2 illustrates the cross-faded overlap computation for both cases of contraction of the play time of the audio signal being processed and expansion of the play time of the audio signal. In both cases, a block of signal representations extending from zero to BUF-1 (length BUF) is partially superimposed (the overlap) with a time shifted copy of the original block. This forms three distinct, contiguous output segments of total length either smaller or greater than the length BUF, depending upon whether contraction or expansion (respectively) is occurring. The point "p" is a point on an array, and particularly, comprises the located signal crossover location having associated therewith the highest normalized correlation computation. The reference to "o" is the overlap. The overlap in each case, whether contraction or expansion, is summarized by the following equation:

overlap=fade * s(n)+(1−fade) * s(n+/−overlap)

where the "+" sign is for contraction and the "−" sign is for expansion. The linear ramp fade is applied from 1 to 0 in the unshifted data block and from 0 to 1 in the time shifted copy.

More specifically, where the following definitions apply:

```
buf_in[0 to BUF-1] = original bloak audio data
buf_out[ ] = output (companded) block audio data
BUF = number of samples in the block
p = starting point for the overlap within buf_in
o = length of the overlap
beta = 1/(p − (p + o))
alpha = −beta*(p + o)
```

The three output block regions are as follows:

```
region 1: pre-overlap
for (n = 0 to p − 1) {buf_out[n] = buf_in[n]}
for both expansion and contraction
region 2: overlap
for (n = p to p + o) {fade = alpha + beta*n
buf_out[n] = fade*buf_in[n] + (1-fade)*buf_in[n + −o]}
+ sign for contraction, − sign for expansion in n + −o
region 3: post-overlap
contraction:
for(n = p + o + 1 to BUF-o-1) {buf_out[n] = buf_in[n + o]}
expansion:
for(n = p + 1 to BUF-1) {buf_out[n + o] = buf_in[n]}
```

Figure 3:
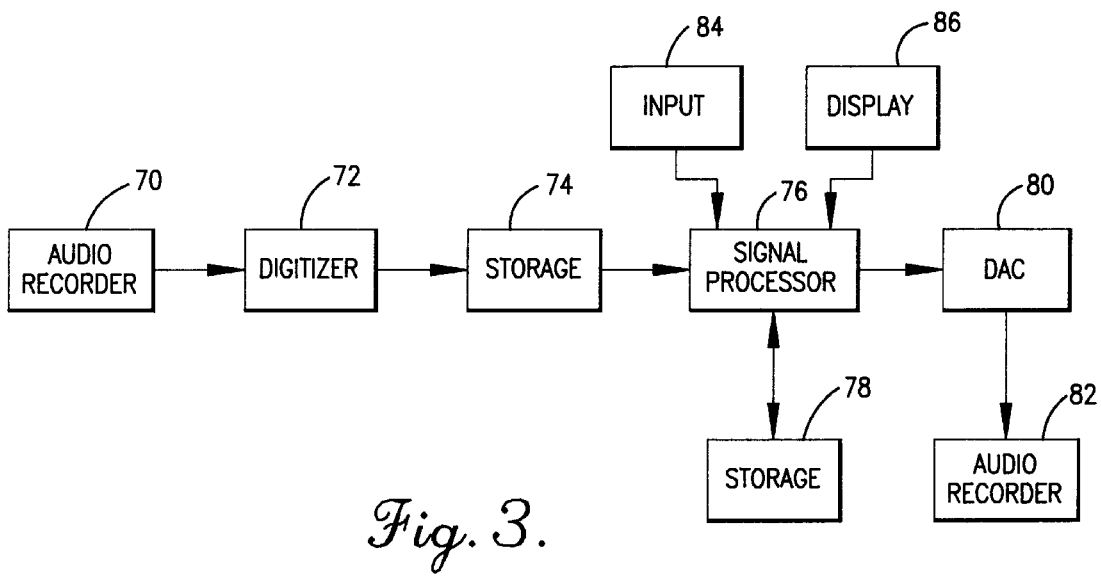
FIG. 3 is a block diagram of a device which operates in accordance with the present invention.

FIG. 3 illustrates the hardware associated with the present invention. An audio recorder 70 is coupled with a digitizer 72. The digitizer 72 is coupled with a storage unit 74, which is in turn coupled with a signal processor 76. Signal processor 76 is coupled with a second storage unit 78. Signal processor 76 is also connected with a digital-to-analog converter 80. Digital-to-analog converter 80 is coupled with a second audio recorder 82. Signal processor 76, as shown, also has an input device (such as a keyboard) 84 and a display 86. Conventional hardware will be readily appreciated by those skilled in the art, and may comprise variations without departing from the spirit of this invention.

An audio signal, including speech or music, or both, is recorded by audio recorder 70. Audio recorder 70 outputs the recorded audio signal to digitizer 72, which converts the audio signal into a stream of digital signal representations. Digitizer 72 outputs the digitized audio signal to storage unit 74. Processor 76 receives the digital audio signal and performs various steps, as more particularly described above in connection with FIGS. 1 and 2. Particularly, after signal processor 76 divides the digital signal into data blocks, signal processor 76 determines the location of signal crossovers within each data block. Storage unit 78 is utilized for storing the array of crossovers for each signal block. Display device 86 may be utilized to monitor data flow and input/output information, while input device 84 may be utilized for inputting desired commands or information.

For instance, once the play time of the audio signal to be processed is determined, which may be determined either manually or automatically by signal processor 76, input device 84 may be utilized for inputting a desired play time. Once signal processor 76 has processed each data block of the stream of signal representations comprising the audio signal to be processed, signal processor 76 outputs an altered audio signal to digital-to-analog converter 80. It will by now be well-appreciated that the altered signal has a play time different from the original audio signal to be processed. At digital-to-analog converter 80, the altered digital audio signal is converted to an analog signal. The analog signal is recorded by audio recorder 82.

The present invention performs extremely well for companding speech audio, musical audio, and combinations of the two. The output results of the present invention, when properly utilized, are essentially free of all noise, distortion, and audible artifacts, and are suitable for evaluation by the demanding commercial broadcast marketplace.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A method for modifying the play time of a digital audio signal to a desired play time, said digital audio signal comprised of data represented by a stream of integers, the data having crossover points and full period crossover lengths defined as a length between successive crossover points having identical signal transition polarity, said method comprising:

obtaining from said digital audio signal a block of data comprised of at least a portion of said digital audio signal, said block thereby including data represented by a portion of said stream of integers;

searching for and locating each existing crossover points within said data block, at which successive integers therein change signs;

determining a position, based upon the results of said searching for crossovers and said crossover locations, at which to superimpose a copy of at least a portion of said data block with said data block including using a correlation determined by a normalized correlation computation;

determining the length of said data block copy to be superimposed based upon the results of said searching including computing a nominal length for said data block copy, wherein said nominal length is determined by the length of said data block, said play time, and said desired play time, using the correlation determined by the normalized correlation computation, and repeatedly summing the full period crossover lengths starting at each said crossover point and continuing until a length of a sum of said crossover lengths, at a minimum, equals said computed nominal length, whereby the repeated step of summing, starting at each said crossover point, produces a plurality of said sums of said crossover lengths;

superimposing a copy of at least a portion of said data block with said data block; and altering, as a result of the superposition, the play time of said data block and therefore altering the play time of said audio signal.

2. The method as set forth in claim 1, wherein each said full period crossover length has an intermediate crossover point with a signal transition polarity opposite the signal transition polarity of the crossover points defining the full period crossover, said step of determining said data block copy length further comprising determining whether each said full period crossover satisfies a selected centrality condition, wherein said centrality condition of each said full period crossover is determined by the location of its intermediate crossover.

3. The method as set forth in claim 2 wherein said step of determining whether each said full period crossover satisfies a selected centrality condition further comprises classifying each said sum of said crossover lengths as an overlap of a first type when said selected centrality condition is met for each full period crossover of the sum of said crossover lengths and, otherwise, classifying each said sum of said crossover lengths as an overlap of a second type.

4. The method as set forth in claim 3 further comprising the step of computing said normalized correlation using each said overlap of said first type when said selected centrality condition is met for each full period crossover of the sum of said crossover lengths.

5. The method as set forth in claim 4 further comprising the step of computing said normalized correlation using said nominal length when said selected centrality condition is not met for each full period crossover of the sum of said crossover length.

6. The method as set forth in claim 5 further comprising the step of computing said normalized correlation using each said overlap of said second type.

7. The method as set forth in claim 6 wherein said steps of determining a position at which to superimpose a copy of at least a portion of said data block with said data block and determining the length of said data block copy includes using a maximum positive correlation, said maximum positive correlation determined by said normalized correlation computation.

8. The method as set forth in claim 7 further comprising the steps of decrementing said nominal length to a decremented length and computing another normalized correlation in association with the decremented nominal length when the maximum positive correlation is not found.

9. The method as set forth in claim 2 further comprising determining whether said intermediate crossover is spaced less than $1/8$ of the length of the full period crossover from a center of the full period crossover.

10. The method as set forth in claim 1 further comprising the step of selecting the center of said data block, as the position at which to superimpose said data block copy, when no crossover points exist in said data block.

11. The method as set forth in claim 1 wherein the step of determining a position at which to superimpose a copy of at least a portion of said data block with said data block further comprises computing said superposition over the data block copy by application of a weighting function.

12. A method for modifying the play time of an audio signal to a desired play time, said audio signal comprised of a stream of signal representations, said method comprising:
   overlapping a block of said signal representations with a copy of at least a portion of said block, the overlapping being a function of said desired play time and including computing a normalized correlation;
   determining the location of signal polarity crossovers within said block;
   determining a position within said block for the overlapping, where said position is determined by the results of determining the location of signal polarity crossovers within said block;
   selecting a length of an overlap to be a length equal to a summed length of full period crossover lengths within said block, wherein full period crossover lengths are defined as a length between successive said signal polarity crossovers having the same signal transition polarity,
   determining if the summed length has a maximum said normalized correlation associated therewith; and
   setting a nominal length to be the selected length of the overlap when said summed length has a maximum said normalized correlation associated therewith.

13. The method as set forth in claim 12 wherein said overlapping step further comprises applying a weighting function to said block of signal representations and to said block copy.

14. The method as set forth in claim 12 wherein said step of determining a position within said block for the overlap includes constraining said position to one signal polarity crossover within the block.

15. A method of modifying the play time of an audio signal to a desired play time, said audio signal comprised of a stream of samples, said method comprising:
   providing a block of said samples of said audio signal;
   locating positions within said block at which said audio signal has polarity crossovers;
   computing a normalized correlation in association with selected said located polarity crossovers including computing a first normalized correlation for a nominal overlap length when a pure tone condition is not satisfied, where said nominal overlap length is determined by the length of said block and said desired play time, and computing a second normalized correlation for at least one chord overlap length when the pure tone condition is not satisfied, where said chord overlap length comprises a sum of full period crossovers, where full period crossovers are defined by successive polarity crossovers having the same signal transition; and
   overlapping a copy of at least a portion of said block with said block, said overlapping being a function of said desired play time and being determined by said normalized correlation computations.

16. The method as set forth in claim 15 wherein said computing step comprises the steps of:
   computing normalized correlations for at least one pure tone overlap length when the pure tone condition is satisfied, where said pure tone overlap length comprises a sum of full period crossovers, where full period crossovers are defined by successive polarity crossovers having the same signal transition.

17. The method as set forth in claim 15 wherein said overlapping step further comprises selecting a maximum positive normalized correlation.

18. The method as set forth in claim 17 wherein said overlapping step further comprises applying a weighting function to said block and said block copy.

19. The method as set forth in claim 17 comprising the steps of:
   outputting said block in unaltered form when no said maximum positive normalized correlation is found;
   providing a next block of said samples of said audio signal; and
   increasing said nominal length by a selected amount.

20. The method as set forth in claim 15 comprising the steps of:

monitoring for an overage which is greater than said nominal length; and outputting said block in unaltered form when said overage is greater than said nominal length.

21. An apparatus for modifying the play time of an audio signal to a desired play time, said audio signal comprised of a stream of samples, said stream of samples exhibiting signal polarity crossovers, said apparatus comprising:

a processor for receiving said audio signal, dividing said audio signal into blocks of said samples, searching for and locating said signal polarity crossovers in each said block of samples, and selectively overlapping each of a plurality of said blocks with at least a partial copy of said each block, to thereby alter said audio signal to said desired play time, wherein said overlap in each block having an overlap is determined by a signal polarity crossover within said block; and the processor including means for summing full period crossovers within said block, starting at each said signal polarity crossover within said block, where full period crossovers are defined by successive signal polarity crossovers having the same signal transition polarity.

22. The apparatus as set forth in claim 21, said processor further comprising means for computing a normalized correlation, wherein said summing means produces a sum, said computing means computes the normalized correlation for said sum.

23. The apparatus as set forth in claim 22 wherein said processor utilizes said normalized correlation for determining said overlap.

24. The apparatus as set forth in claim 21 further comprising:

an first audio recorder for recording audio; and a digitizer, coupled with said audio recorder, for digitizing audio recorded by said audio recorder into a digital audio signal, wherein said processor receives said digital audio signal.

25. The apparatus as set forth in claim 24, wherein said processor has means for outputting said altered signal, said apparatus further comprising:

a digital to analog convertor, coupled with said processor, for receiving said altered digital signal and converts said digital signal to an analogue signal; and a second audio recorder, coupled with said convertor, for recording said analogue audio signal.

26. A method for modifying the play time of a digital audio signal to a desired play time, said digital audio signal comprised of data represented by a stream of integers, the data having crossover points and full period crossover lengths defined as a length between successive crossover points having identical signal transition polarity, said method comprising:

obtaining from said digital audio signal a block of data comprised of at least a portion of said digital audio signal, said block thereby including data represented by a portion of said stream of integers;

searching for and locating each existing crossover points within said data block, at which successive integers therein change signs;

determining a position, based upon the results of said searching for crossovers and said crossover locations, at which to superimpose a copy of at least a portion of said data block with said data block including using a correlation determined by a normalized correlation computation;

determining the length of said data block copy to be superimposed based upon the results of said searching, including computing a nominal length for said data block copy, wherein said nominal length is determined by the length of said data block, said play time, and said desired play time;

superimposing a copy of at least a portion of said data block with said data block;

altering, as a result of the superposition, the play time of said data block and therefore altering the play time of said audio signal; and selecting the center of said data block, as the position at which to superimpose said data block copy, when no crossover points exist in said data block.

* * * * *